INVENTOR
NICHOLAS NOVIELLO, JR.
BY
ATTORNEY 3,383,077
BRAKING ARRANGEMENT
Nicholas Noviello, Jr., 10 Ely Road, Gulf Manor,
Peekskill, N.Y. 10566
Filed Oct. 10, 1966, Ser. No. 585,572
7 Claims. (Cl. 244—113)

ABSTRACT OF THE DISCLOSURE

An apparatus for emergency braking of a vehicle traveling on a hard surface or through a fluid, by converting the forward momentum of the vehicle into an upward motion. The center of gravity of the vehicle is thus raised against the force of gravity thereby absorbing some of the kinetic energy of the forward motion of the vehicle. The fore end of the vehicle is raised by means of a rigid rod pivotally connected at one end to the center of the underside of the vehicle and at the other end to the front of a rigid brake frame, the aft end of the vehicle being pivotally and forward slidably connected to the said brake frame. A stabilizing bar may be pivotally attached to the aft end of the vehicle, to be thrust forward, in relation to the brake frame, when the braking arrangement is actuated, for helping to stabilize the vehicle. Energy absorbing devices, as a cylinder and piston or a coil spring, may be introduced at proper points in the braking arrangement for absorbing additional energy on the braking arrangement being actuated.

---

Figure 1:
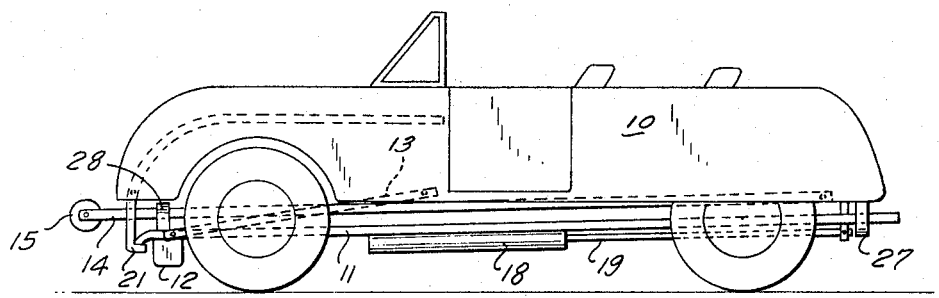

This invention relates to my copending applications Ser. Nos. 423,608, filed Jan. 5, 1965, now abandoned, and 572,038, filed Aug. 12, 1966, now abandoned, and to the same subject matter shown therein.

My invention relates in general to emergency braking devices and more particularly to emergency braking devices for vehicles traveling through or on some median, not in open space.

My braking device will be described in connection with a vehicle designed for travel on a hard level surface, but it is to be understood that the invention may be applied also to vehicles of other types, including air-borne and water-borne as well as surface-borne vehicles. My invention is for emergency braking, and is not intended to effect a completely controlled stop, it being assumed that each vehicle on which my braking arrangement will be mounted will have its own means, apart from this braking arrangement, for controlling yaw and roll.

It often requires too much space to bring a moving vehicle to a stop. Sometimes this results in costly wrecks. Further, whether or not the vehicle crashes, a sudden stop may, because of inertia, result in injury to the passengers or cargo carried by the vehicle, should the same be thrown forward from their respective seats or positions.

The braking arrangement comprising this invention is designed not only quickly to reduce the speed of a moving vehicle, but also to reduce the chance of injury to passengers and cargo, or either, due to their own momentum, during deceleration of the vehicle. A means for assisting in stabilizing the vehicle during, and being actuated by, the vehicle's deceleration, may be employed in combination with my braking arrangement.

An object of this invention is the provision of a braking arrangement mounted on a vehicle to assure more rapid deceleration of the vehicle.

Another object is the provision of a braking arrangement which will help to prevent, during rapid deceleration of a vehicle, the vehicle's passengers from being thrown forward from their seats and its cargo from shifting, because of their respective momenta.

Another object of this invention is to turn the forward motion of a vehicle to an upward motion, thus allowing gravity to help reduce the speed of the vehicle, or, if the braking arrangement is made to turn the vehicle in another direction than upward, to reduce the speed of the vehicle by causing the relatively greater amount of friction, caused by the braking device in operation, against the medium in which the vehicle is traveling, to help reduce the speed of the vehicle.

Another object of the invention is to be able quickly to turn a vehicle having a relatively more streamlined front than other outer surfaces, and moving in a forward direction, to a position in which the underside of the vehicle, or some surface less streamlined than the front, is placed forward in the direction of travel, thus allowing air or water resistance, as the case may be, to aid in reducing the speed of the vehicle.

Another object of the invention is to change the position of a moving vehicle from a plane parallel to that of the direction of its motion to a plane substantially perpendicular thereto, for the purpose of causing the respective momenta of the passengers and articles of cargo, on the deceleration of the vehicle during braking, to press the passengers and cargo into their respective seats and positions, rather than to pull them out of same.

Another object of the invention, in the case of an inevitable crash into an object in the direct path of the braking vehicle, is to move the passengers out of the way of what may be the area of impact.

Another object of the invention is to provide a stabilizer, which will automatically come into operation on application of the braking arrangement, for aiding in stabilizing the vehicle during its deceleration.

Figure 2:
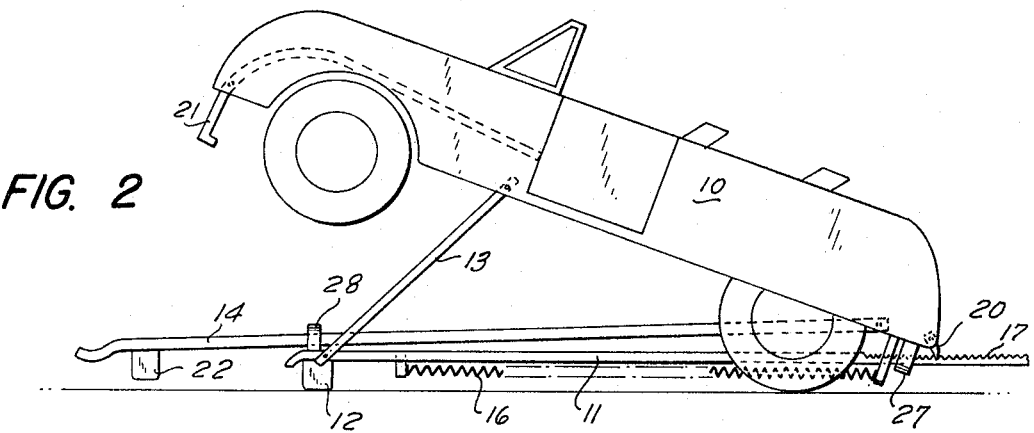

Other objects and a fuller understanding of the invention may be had by referring to the following description adn claims, taken in conjunction with the accompanying drawings, in which:

FIG. 1 is a diagrammatic side view of a vehicle designed for use on a hard level horizontal surface, showing the invention of the braking arrangement latched in retracted or non-braking position, mounted on the underside of, and approximately along the center line of, the vehicle, and also shown are a stabilizing bar with a wheel on its front end, for aiding in preventing forward somersault of the vehicle, and a cylinder and piston device to absorb some of the energy comprising the forward momentum of the vehicle on decelerating and to prevent the fore end of the vehicle from falling, after the braking operation;

FIG. 2 is a diagrammatic side view of the same vehicle, showing the positions of the various parts of the braking arrangement after said braking arrangement has been actuated by unlatching the front end of the brake frame from the fore end of the vehicle; also shown is a friction pad instead of a wheel on the front end of the stabilizing bar, to aid in reducing the forward velocity of the vehicle, and also shown are a helical resilient coil for absorbing, during the braking operation, some of the energy comprising the forward momentum of the vehicle, and a pawl and ratchet device for restraining the vehicle from returning to its normal traveling position after having been caused to move therefrom by the braking operation.

Figure 3:
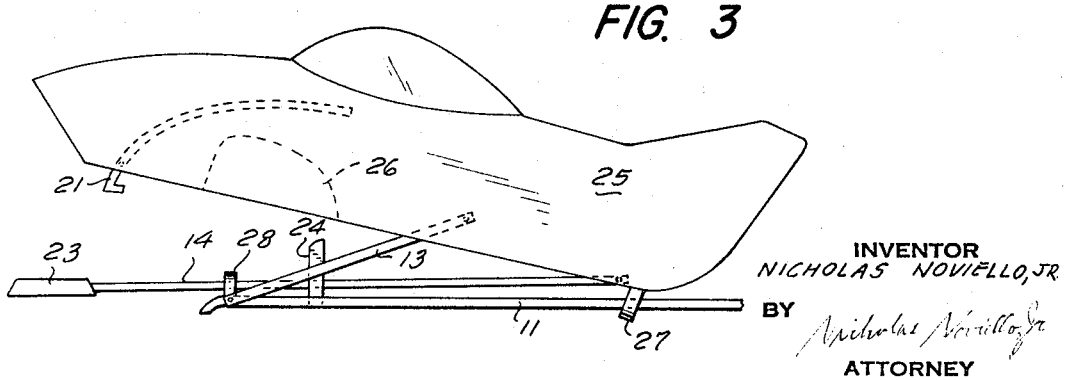

FIG. 3 is a diagrammatic side view of a vehicle designed for travel through a fluid, showing a friction flap instead of a friction pad attached to the brake frame, and a stabilizing flap, instead of a wheel or friction pad, on the front end of the stabilizing bar.

With reference to the drawings, the braking arrangement is mounted on the underside of a vehicle 10 and approximately along the center line thereof, and is designed to be carried by the vehicle, in non-braking position, above and out of contact with the surface. An analogous braking arrangement may be carried by and under an air-borne or water-borne vehicle 25 and concealed in, or held close to, the body of such vehicle for reducing friction drag.

The braking arrangement comprises briefly:

(1) A slide means 27, a preferred embodiment of which is a metal ring, transversely pivotally mounted on the lower aft end and at the central longitudinal axis, of the vehicles 25 and 10.

(2) A rigid brake frame 11, a preferred embodiment of which is a single flat metal bar, the lower front end of which may be formed so as to cause a friction drag, said brake frame 11 being longitudinally movably mounted on said slide means 27.

(3) A latching means 21 movably mounted at the fore end of the vehicle, in latching position for holding the front end of the brake frame 11 fixedly to the fore end of the underside of said vehicle, and in releasing position for releasing said front end of said brake frame 11, thus allowing said front end of said brake frame 11, and said fore end of said vehicle to move apart from one another, thus actuating said braking arrangement.

(4) A rigid raising rod 13, a preferred embodiment of which is a single straight metal rod, of approximately circular cross-section, transversely pivotally connected at its front end to said forward end of said brake frame and transversely pivotally connected at its rear end to the midsection underside at the central longitudinal axis of the vehicle. The raising rod 13 lies, in normal travel, substantially parallel to the longitudinal axis of said brake frame, and approximately along the center line of such vehicle 10 or 25, and when the latching means 21 is actuated to release said front end of said brake frame 11 causing the consequent dropping of said front end of said brake frame 11 to the surface on which said vehicle 10 is assumed to be traveling, thereby causing a friction drag between said front end of said brake frame 11 and said surface, and the aft end of the vehicle 10 thereby being forced front in relation to said forward end of the brake frame 11, said raising rod 13 is thereby forced to a position substantially less parallel to the longitudinal axis of said brake frame 11, thus raising said fore end of said vehicle 10 in relation to said front end of the brake frame 11, and thus causing some of the forward momentum of the vehicle 10 to be expended in lifting the center of gravity of the vehicle 10 against the force of gravity.

(5) As a first optional feature, a friction means, which may comprise a friction pad 12, may be mounted on said front end of said brake frame and be normally carried above the hard surface on which said vehicle 10 is assumed to be traveling, but which, when the latching means 21 is actuated to release said front end of the brake frame 11, causing the consequent dropping of said front end of said brake frame 11 due to the pull of gravity, will be caused to come into contact with such surface, for producing a friction drag. Lowering, rotating or inflating such friction pad 12 are various alternate methods which may be employed for causing such contact. On vehicles designed for travel on snow or ice, spikes may be mounted on said friction pad 12. On fluid-borne vehicle 25, a flap, 24 which may be a flat piece of metal attached by conventional means to the upper part of said front end of brake frame 11, and be disposed transversely to, and with its flat surface in a plane parallel to the longitudinal axis of said brake frame 11, and which may be fixed in streamlined position, perhaps in a recess 26, in such fluid-borne vehicle 25, and exposed on braking to cause friction drag against the medium through or on which such vehicle 25 is traveling, may be included, omitting said friction pad 12. Also, in a fluid-borne vehicle 25, the front end of the brake frame 11 may be caused to move away from the fore end of the body of the vehicle 25 by the drag of friction or resistance caused by such friction means 24 against such fluid, as well as by the pull of gravity. Said front end of said brake frame, or said friction pad 12, coming into contact with said surface, or said friction flap 24, due to resistance against movement through such fluid, causes a friction drag, forcing the rear end of said brake frame 11 to move relatively less slowly forward than such vehicle 10 or 25. Due to the momentum of such vehicle 10 or 25, its aft end moves forward in relation to the rear end of the now dragging brake frame 11, to which the vehicle's lower aft end remains transversely pivotally and longitudinally slidable connected by means of slide means 27.

(6) As a second optional feature, a stabilizing bar 14, a preferred embodiment of which is a single metal rod of approximately circular cross-section, and which may have a wheel 15 or a second friction pad 22 mounted on its front end, may be, with its longitudinal axis parallel to the longitudinal axis of brake frame 11, longitudinally movably mounted on the front end of said brake frame 11 through loop 28, a preferred embodiment of said loop 28 being a circular metal loop into which the upper front end of said brake frame 11 has been formed; said loop 28 being so positioned thereon and said stabilizing bar 14 being so formed, that, if such vehicle is traveling on a surface, neither said front end of stabilizing bar 14, nor the wheel 15 if such be mounted thereon, will contact the surface in such a manner as to cause the lower front end of brake frame 11, or friction pad 12, if such be mounted thereon, to lose contact with such surface, and the rear end of said stabilizing bar 14 being transversely pivotally connected to the lower aft end of said vehicle 10, the forward movement of the aft end of said vehicle 10 in relation to said front end of said brake frame 11 forcing such stabilizing bar 14 to be thrust front of said forward end of said brake frame 11, for aiding to prevent forward roll or somersaulting of said vehicle 10 when said braking arrangement is actuated. In the case of a fluid-borne vehicle 25, a stabilizing flap 23, a preferred embodiment of which is a flat piece of metal, attached by conventional means to the front end of stabilizing bar 14 and concealed in or held close to the body of such vehicle 25 for minimizing resistance to travel, may be similarly thrust forward of said front end of said brake frame 11, for aiding in stabilizing such vehicle 25 by adding lifting force while such vehicle 25 is losing speed during the brake operation, said flap 23 is disposed transversely to, and with its flat surface in a plane parallel to the longitudinal axis of, brake frame 11.

(7) As a third optional feature, a pressure absorbing means, such as a helical resilient coil or coil spring 16, or cylinder 18 and piston 19 means, which will be compressed by the forward movement of the aft end of such vehicle 10 or 25 in relation to the brake frame 11, may be mounted between the brake frame 11 and the aft end of said underside of such vehicle 10 or 25 or said slide means 27 for absorbing some of the forward momentum of such vehicle 10 or 25 thus aiding to decelerate such vehicle 10 or 25 in a relatively short time and a relatively short space. The pressure absorbing capacity of such spring 16 or other pressure absorbing means 18 and 19 may be made to vary in accordance with the varying speed of such vehicle 10 or 25.

(8) As a fourth optional feature, a restraining means, such as a pawl 20 and ratchet 17, or a cylinder 18 and piston 19 for preventing the fore end of such vehicle 10 or 25 from falling too quickly or rapidly after such vehicle 10 or 25 has lost its forward momentum, may also be mounted between said brake frame 11 and the lower aft end of said vehicle 10 or 25 or said slide means 27.

A broad visualization of the braking arrangement reveals that it comprises four principal structural features Nos. 1 to 4 inclusive, and four additional optional structural features Nos. 5 to 8, inclusive, namely:

(1) A slide means 27 a preferred embodiment of which is a metal ring, transversely pivotally mounted on the lower aft end of the vehicle 10 or 25, about midway between the two sides of such vehicle 10 or 25.

(2) A rigid brake frame 11, a preferred embodiment of which is a single flat metal bar, longitudinally slidably mounted through the ring comprising said slide means 27, said brake frame 11 is mounted with its longitudinal axis parallel to the longitudinal axis of said vehicle 10 or 25.

(3) A latching means 21 mounted on the fore end of the underside of such vehicle 10 or 25, for holding the front end of the brake frame 11 fixed in close proximity to the body of such vehicle, and for releasing said front end of said brake frame 11 when it is desired to decelerate such vehicle 10 or 25.

(4) A rigid raising rod 13, a preferred embodiment of which is a single metal rod of approximately circular cross-section, the front end of which is transversely pivotally mounted on said front end of said brake frame 11 and the rear end of which is transversely pivotally mounted on the midsection of the underside of such vehicle 10 or 25, for forcing said fore end of such vehicle 10 or 25 to rise in relation to said front end of the brake frame 11 when said braking arrangement is actuated.

(5) A friction means 12 or 24 mounted by conventional means on the front end of said brake frame for causing, when said latching means is actuated, a friction drag against the medium supporting such vehicle 10 or 25 in travel.

(6) A vehicle stabiziling means 14, a preferred embodiment of which is a single metal bar of approximately circular cross-section and having its front end formed so as to aid in stabilizing such vehicle 10 or 25 while such vehicle 10 or 25 is decelerating, longitudinally slidably mounted on said front end of said brake frame 11 through loop 28, a preferred embodiment said loop 28 being a circular metal loop into which the upper front end of said brake frame 11 has been formed, said loop 28 being so positioned thereon and stabilizing bar 14 being so shaped, that if such vehicle 10 or 25 is traveling on a surface, neither the front end of stabilizing bar 14, nor friction pad 22, if such be mounted thereon, will come into contact with such surface in such a manner as to prevent stabilizing bar 14 from sliding forward through said loop 28 when the braking arrangement is actuated, said stabilizing means 14 being actuated by the forward motion of said aft end of said underside of such vehicle 10 or 25 in relation to said front end of said brake frame, for helping to stabilize the position in motion of or to support such vehicle 10 or 25 during deceleration, when said braking arrangement is actuated. Such stabilizing means 14 is for aiding in stabilizing the vehicle during deceleration, it being assumed that each such vehicle is equipped with proper conventional means for stabilizing itself, for example, the wheels on a wheeled vehicle being in contact with the surface on which the vehicle is traveling serve to stabilize the vehicle as well as to reduce friction.

(7) An energy absorbing or storing device, such as a cylinder 18 transversely pivotally mounted on said brake frame 11, and piston 19 transversely pivotally mounted on said slide means 27 or on such vehicle 10 or 25, or resilient helical coil 16, mounted between said brake frame 11 and said slide means 27 or such vehicle 10 or 25, for absorbing or storing, when the braking arrangement is actuated forcing decelerating of said vehicle, some of the energy comprising the forward momentum of the vehicle.

(8) A restraining means, such as the cylinder 18 and piston 19 means or a pawl 20 and ratchet 17 means, mounted between said brake frame 11 and such vehicle 10 or 25 or slide means 27, for preventing such vehicle, after having been braked, from returning to its normal driving position; that is, for supporting said fore end of such vehicle 10 or 25 in its braked position, to prevent possible injury or damage caused by the shock of the vehicle too rapidly falling or returning to its normal traveling position.

The braking arrangement, in use, operates as follows: Let it be assumed that the vehicle 10 is moving forward on a hard level horizontal surface. The brake frame 11, the lower front end of which may be formed so as to cause a friction drag when applied to said surface, is carried by the vehicle 10 above said surface, the front end of brake frame 11 being held fixedly against the fore end of the underside of such vehicle 10 and out of contact with said surface by the latching means 21, and the rear end of said brake frame being longitudinally slidably held in proximity to the aft end of the underside of said vehicle 10 by slide means 27, said slide means 27 being transversely pivotally mounted on said aft end of said underside of said vehicle 10. When said latching means 21 is actuated, thereby releasing said front end of the brake frame 11, and thereby causing said front end of said brake frame 11 to come into contact with said surface due to the pull of gravity, a friction drag is established between such surface and said brake frame 11, thus slowing the forward movement of said brake frame 11 in relation to such vehicle 10. The forward momentum of the vehicle forces the center of gravity of the vehicle to continue to move as far forward in relation to the brake frame 11 as possible. The combination of the lower aft end of the vehicle being transversely pivotally and longitudinally slidably connected to the rear end of said brake frame 11 by slide means 27, and the rigid raising rod 13 being transversely pivotally connected at its front end to said front end of said brake frame 11 and at its rear end transversely pivotally connected to the midsection underside of the vehicle 10 and approximately midway between the two sides of said vehicle 10, forces the forward motion of the center of gravity of the vehicle 10 to swing into an upward direction in relation to the brake frame 11, thus causing part of the energy of the forward momentum of the vehicle 10 to be expended in raising said fore end of the vehicle 10 upward against the force of gravity. The raising rod 13 is thus employed for changing the forward momentum of said vehicle 10 into upward motion, thereby reducing the forward velocity of said vehicle 10. A friction means, which may comprise a friction pad 12, may be mounted on the underside of said front end of said brake frame 11, for causing a friction drag when applied against said surface. A force absorbing or energy storing means transversely pivotally mounted between the vehicle 10 or said slide means 27 and the brake frame 11, such as a resilient helical coil 16, or cylinder 18 and piston 19 device, may be used in combination with said braking arrangement for absorbing, during the braking operation, some of the energy comprising the forward momentum of said vehicle 10.

Although the invention has been described in its present form with a certain degree of particularity, it is understood that the present disclosure of the preferred form has been made only by way of example and that numerous changes in the details of the construction and the combination and arrangements of the parts may be resorted to without departing from the spirit and scope of the invention as hereinafter claimed.

I claim as my invention:

1. In combination with a mobile vehicle having an underside having a fore end, a midsection and an aft end, a braking arrangement, comprising, in combination, a slide means transversely pivotally mounted on said aft end of said underside of said vehicle, a rigid brake frame having a front end and a rear end, said front end so shaped as to create a friction drag when applied against the medium supporting said vehicle in motion, said brake frame being longitudinally slidably mounted on said slide means, the longitudinal axis of said brake frame being substantially parallel to the direction of normal forward travel of said vehicle, a latching means movably mounted on said fore end of said underside of said vehicle for holding said front end of said brake frame fixedly against said fore end of said underside of said vehicle, in a position wherein the friction drag of said brake frame against such medium supporting said vehicle in travel is reduced and, when actuated, for releasing said front end of said brake frame, thereby allowing said front end of said brake frame to fall away from said vehicle, thereby allowing said front end of said brake frame to create a friction drag against the medium supporting said vehicle in travel, and thereby causing said front end of said brake frame to slide rearward, in relation to said aft end of said underside of said vehicle, and a rigid raising rod having a front end and a rear end, said front end of said raising rod being transversely pivotally mounted on said front end of said brake frame and said rear end of said raising rod being transversely pivotally mounted on said mid-section of said underside of said vehicle, for forcing said fore end of said underside of said vehicle to move relatively farther away from said front end of said brake frame when said front end of said brake frame slides rearward in relation to said aft end of said underside of said vehicle, forcing said vehicle to turn from the projected path of said vehicle's forward motion, thereby decelerating the velocity of such forward motion of said vehicle.

2. In combination with a mobile vehicle designed for use on a substantially horizontal surface and having an underside having a fore end a midsection and an aft end a braking arrangement comprising in combination a slide means transversely pivotally mounted on said aft end of said underside of said vehicle a rigid brake frame having a front end and a rear end said front end being so shaped that it creates a friction drag when applied against said surface said brake frame being longitudinally slidably mounted on said slide means the longitudinal axis of said brake frame being substantially parallel to the direction of normal forward travel of said vehicle a latching means mounted on said fore end of said underside of said vehicle, for holding said front end of said brake frame fixedly against said fore end of said underside of said vehicle and out of contact with said horizontal surface, and, when actuated, for releasing said front end of said brake frame, thereby allowing said front end of said brake frame to fall to said horizontal surface, thereby creating a friction drag between said horizontal surface and said brake frame, and thereby causing said brake frame to slide rearward in relation to said aft end of said underside of said vehicle, and a rigid raising rod, having a front end and a rear end, said front end of said raising rod being transversely pivotally mounted on said front end of said brake frame and said rear end of said raising rod being transversely pivotally mounted on said midsection of said underside of said vehicle, for raising said fore end of said underside of said vehicle in relation to said front end of said brake frame, when said front end of said brake frame slides rearward in relation to said aft end of said underside of said vehicle, thereby converting some of the forward momentum of said vehicle into upward motion against the force of gravity, and thereby reducing the forward velocity of said vehicle.

3. In combination with a mobile vehicle having an underside having a fore end, a midsection and an aft end, a braking arrangement, comprising, in combination, a slide means transversely pivotally mounted on said aft end of said underside of said vehicle, a rigid brake frame having a front end and a rear end, said brake frame being longitudinally slidably mounted on said slide means, the longitudinal axis of said brake frame being substantially parallel to the direction of normal forward travel of said vehicle, a friction means mounted on said front end of said brake frame for creating friction drag against a medium in relation to which said vehicle is moving in a forward direction, a latching means mounted on said fore end of said underside of said vehicle, for holding said front end of said brake frame fixedly against said fore end of said underside of said vehicle, in a position wherein friction drag of said friction means is reduced, and, when actuated, for releasing said front end of said brake frame, thereby allowing said front end of said brake frame to fall away from said vehicle, thereby allowing said friction means to create a friction drag against said medium in relation to which said vehicle is moving forward, forcing said front end of said brake frame to slide rearward in relation to said aft end of said underside of said vehicle, and a rigid raising rod having a front end and a rear end, said front end of said raising rod being transversely pivotally mounted on said front end of said brake frame and said rear end of said raising rod being transversely pivotally mounted on said midsection of said underside of said vehicle, for forcing said fore end of said underside of said vehicle to move relatively farther away from said front end of said brake frame when said front end of said brake frame slides rearward in relation to said aft end of said underside of said vehicle, thereby forcing said vehicle to turn from the projected path of said vehicle's forward motion, thereby decelerating the velocity of such forward motion of said vehicle.

4. In combination with a fluid-borne mobile vehicle having an underside having a forward end, a midsection and a rear end and having a recess in said underside, a braking arrangement comprising, in combination, a slide means transversely pivotally mounted on said aft end of said underside of said vehicle, a rigid brake frame having a front end and a rear end, said brake frame being longitudinally slidably mounted on said slide means, the longitudinal axis of said brake frame being substantially parallel to the direction of normal forward travel of said vehicle, a drag flap mounted on said front end of said brake frame for creating friction drag against said fluid, a latching means mounted on said fore end of said underside of said vehicle, for holding said front end of said brake frame fixedly against said fore end of said underside of said vehicle in a position in which said drag flap is concealed in said recess in said underside of said vehicle, and, on being actuated, for releasing said front end of said brake frame, thereby allowing said front end of said brake frame to fall away from said vehicle, thereby exposing said drag flap thus allowing said drag flap to create a friction drag against said fluid and thereby forcing said front end of said brake frame to slide rearward in relation to said aft end of said underside of said vehicle, and a rigid raising rod having a front end and a rear end, said front end of said raising rod being transversely pivotally mounted on said front end of said brake frame and said rear end of said raising rod being transversely pivotally mounted on said midsection of said underside of said vehicle, for forcing said fore end of said underside of said vehicle to move relatively farther away from said front end of said brake frame when said front end of said brake frame slides rearward in relation to said aft end of said underside of said vehicle, thereby forcing said vehicle to turn from the projected path of said vehicle's forward motion thereby decelerating the velocity of such forward motion of said vehicle.

5. In combination with a mobile vehicle having an underside having a fore end, a midsection and an aft end, a braking arrangement, comprising, in combination, a slide means transversely pivotally mounted on said aft end of said underside of said vehicle, a rigid brake frame having a front end and a rear end, said front end being formed so as to create a friction drag when applied against the medium supporting said vehicle in motion, and also with a loop on said front end of said brake frame, said brake frame being longitudinally slidably mounted on said slide means, the longitudinal axis of said brake frame being substantially parallel to the direction of normal forward travel of said vehicle, a latching means movably mounted on said fore end of said underside of said vehicle for holding said front end of said brake frame fixedly against said fore end of said underside of said vehicle, in a position wherein the friction drag of said front end of said brake frame against such medium supporting said vehicle in travel is reduced, and, when actuated for releasing said front end of said brake frame, thereby allowing said front end of said brake frame to fall away from said vehicle, thereby allowing said front end of said brake frame to create a friction drag against the medium supporting said vehicle in travel, forcing said front end of said brake frame to slide rearward, in relation to said aft end of said underside of said vehicle; a rigid raising rod having a front end and a rear end, said front end of said raising rod being transversely pivotally mounted on said front end of said brake frame and said rear end of said raising rod being transversely pivotally mounted on said midsection of said underside of said vehicle, for forcing said fore end of said underside of said vehicle to move relatively farther away from said front end of said brake frame when said front end of said brake frame slides rearward in relation to said aft end of said underside of said vehicle, thereby forcing said vehicle to turn from the projected path of said vehicle's forward motion, thereby decelerating the velocity of such forward motion of said vehicle, and a rigid stabilizing means having a front end and a rear end, said front end being designed for supporting, and stabilizing the motion of, said vehicle when applied against the medium supporting said vehicle in motion, and said rear end of said stabilizing means being transversely pivotally mounted on said aft end of said underside of said vehicle, said stabilizing means being longitudinally slidably mounted through said loop on said front end of said brake frame, said stabilizing means being forced to slide forward in relation to said front end of said brake frame when said front end of said brake frame slides rearward in relation to said aft end of said underside of said vehicle, thereby forcing said front end of said stabilizing means to be applied against said medium supporting said vehicle in travel, thereby aiding in stabilizing the motion of and supporting said vehicle during the braking operation as hereinabove described.

6. In combination with a mobile vehicle designed for use on a substantially horizontal surface and having an underside having a fore end, a midsection and an aft end, a braking arrangement, comprising, in combination, a slide means transversely pivotally mounted on said aft end of said underside of said vehicle, a rigid brake frame having a front end and a rear end, said front end being designed for creating a friction drag when applied against said surface, said brake frame also having a loop in its said front end, said brake frame being longitudinally slidably mounted on said slide means, the longitudinal axis of said brake frame being substantially parallel to the direction of normal forward travel of said vehicle, a latching means mounted on said fore end of said underside of said vehicle, for holding said front end of said brake frame fixedly against said fore end of said underside of said vehicle and out of contact with said surface, and when actuated, for releasing said front end of said brake frame, thereby allowing said front end of said brake frame to fall to said surface, thereby creating a friction drag between said surface and said brake frame, and thereby causing said brake frame to slide rearward in relation to said aft end of said underside of said vehicle, a rigid raising rod, having a front end and a rear end, said front end of said raising rod being transversely pivotally mounted on said front end of said brake frame and said rear end of said raising rod being transversely pivotally mounted on said midsection of said underside of said vehicle, for raising said fore end of said underside of said vehicle in relation to said front end of said brake frame, when said front end of said brake frame slides rearward in relation to said aft end of said underside of said vehicle, thereby converting some of the forward momentum of said vehicle into upward motion against the force of gravity, thereby reducing the forward velocity of said vehicle, and a rigid stabilizing bar having a front end and a rear end, said front end of said stabilizing bar being designed for aiding in stabilizing the motion of and supporting said vehicle when applied against said surface, and said rear end of said stabilizing bar being transversely pivotally mounted on said aft end of said underside of said vehicle, said stabilizing bar being longitudinally slidably mounted through said loop, said stabilizing bar being caused to slide forward in relation to said brake frame and said front end of said stabilizing bar being caused to come into contact with said surface, when said aft end of said underside of said vehicle slides forward in relation to said front end of said brake frame, thereby tending to prevent somersaulting of said vehicle after actuation of said braking device.

7. In combination with a mobile vehicle supported by a fluid during forward horizontal travel and having an underside having a fore end, a midsection and an aft end, said vehicle also having a recess in said fore end of its said underside, a braking arrangement, comprising, in combination, a slide means transversely pivotally mounted on said aft end of said underside of said vehicle, a rigid brake frame having a front end and a rear end, said brake frame being designed with a loop on said front end, said brake frame being longitudinally slidably mounted on said slide means, the longitudinally axis of said brake frame being substantially parallel to the direction of forward travel of said vehicle, a drag flap mounted on said front end of said brake frame for creating resistance to motion through said fluid, a latching means mounted on said fore end of said underside of said vehicle, for holding said front end of said brake frame fixedly against said fore end of said underside of said vehicle, said drag flap being thereby concealed in said recess for reducing resistance to forward travel through said fluid, and, when said latching means is actuated, for releasing said front end of said brake frame, thereby allowing said front end of said brake frame to fall away from said fore end of said underside of said vehicle, thereby exposing said drag flap, thereby creating resistance to travel through said fluid, forcing said front end of said brake frame to slide rearward in relation to said aft end of said underside of said vehicle, a rigid raising rod having a front end and a rear end, said front end of said raising rod being transversely pivotally mounted on said front end of said brake frame and said rear end of said raising rod being transversely pivotally mounted on said midsection of said underside of said vehicle, for forcing, when said front end of said brake frame slides rearward in relation to said aft end of said underside of said vehicle, said raising rod into a relatively more vertical position, thus forcing said fore end of said underside of said vehicle to rise out of the projected path of forward motion of said vehicle, thereby changing part of the forward momentum of said vehicle into an upward motion and thereby reducing the forward velocity of said vehicle, a rigid stabilizing bar having a front end and a rear end, said rear end of said stabilizing bar being transversely pivotally mounted on said aft end of said underside of said vehicle, said stabilizing bar being longitudinally slidably mounted through said loop on said front end of said brake frame, said stabilizing bar being forced to slide forward in relation to said brake frame when said aft end of said underside of said vehicle slides forward in relation to said front end of said brake frame, and a stabilizing flap mounted on said front end of said stabilizing bar, for aiding in stabilizing said vehicle during the deceleration thereof when said stabilizing bar is forced to slide forward when said braking arrangement is actuated.

References Cited

UNITED STATES PATENTS

| 645,628 | 3/1900 | Pletcher | 188—5 |
| 1,282,054 | 10/1918 | Dorohon | 188—5 |
| 2,113,056 | 4/1938 | McKinnon | 188—5 |
| 2,871,986 | 2/1959 | Polovitch | 188—5 |

MILTON BUCHLER, *Primary Examiner.*

P. E. SAUBERER, *Assistant Examiner.*